United States Patent
Sawamura et al.

(10) Patent No.: US 6,440,360 B1
(45) Date of Patent: Aug. 27, 2002

(54) PB-FREE SOLDERING ALLOY

(75) Inventors: Tadashi Sawamura; Hisashi Komiya, both of Tokyo (JP)

(73) Assignee: Tokyo First Trading Company (JP)

( * ) Notice: Subject to any disclaimer, the term of this patent is extended or adjusted under 35 U.S.C. 154(b) by 0 days.

(21) Appl. No.: 09/786,548

(22) PCT Filed: Mar. 17, 2000

(86) PCT No.: PCT/JP00/01636

§ 371 (c)(1),
(2), (4) Date: Mar. 2, 2001

(87) PCT Pub. No.: WO01/70448

PCT Pub. Date: Sep. 27, 2001

(51) Int. Cl.$^7$ ................................................ B23K 35/26
(52) U.S. Cl. ....................................... 420/560; 148/400
(58) Field of Search ........................... 148/400; 420/560

(56) References Cited

U.S. PATENT DOCUMENTS 5,837,191 A  *  11/1998  Gickler
5,863,493 A  *  1/1999   Achari et al. ................ 420/557
6,139,979 A  *  10/2000  Takaoka et al. ............ 428/646

FOREIGN PATENT DOCUMENTS

| | | | |
|---|---|---|---|
| DE | 19816671 | * | 10/1998 |
| JP | 5251452 | * | 9/1993 |
| JP | 8045940 | * | 2/1996 |
| JP | 10034376 | * | 2/1998 |
| JP | 10286689 | * | 10/1998 |
| JP | 11277290 | * | 10/1999 |
| WO | 9712719 | * | 4/1997 |
| WO | 9948639 | * | 9/1999 |

* cited by examiner

Primary Examiner—Sikyin Ip
(74) Attorney, Agent, or Firm—Bierman, Muserlian and Lucas

(57) ABSTRACT

The present invention proposes Pb-free soldering alloy which does not contain Pb to prevent the environment from being contaminated by Pb when the soldered product is put on a wasteyard and to enhance the mechanical strength at the soldered joint by the soldering alloy. The Pb-free soldering alloy is characterized in that it contains Cu in 0.05 to 2.0 wt. %, Ni in 0.001 to 2.0 wt. % and Sn in the balance.

1 Claim, No Drawings

PB-FREE SOLDERING ALLOY

TECHNICAL FIELD

The present invention relates to Pb-free soldering alloy which does not include Pb.

BACKGROUND TECHNOLOGY

Eutectic soldering alloy which comprises Sn in 60 wt. % and Pb in 40 wt. % or which comprises Sn in 63 wt. % and Pb in 37 wt. % has been used for a long time in the field of the jointing technology of electronic parts.

In case an electronic device assembled by soldering by use of Pb-rich solder is put on a waste yard, there arises an environmental problem that acid rain dissolves Pb out of the solder joint and contaminates the underground water. It is said that when Pb enters a human body Pb puts the central nerve out of order and causes a hemoglobin trouble in the blood.

Thus it is the purpose of the present invention to propose Pb-free soldering alloy which does not include any amount of Pb to prevent the environment from being contaminated by Pb in case the soldered product is put on a waste yard and which makes it possible to enhance the mechanical strength of the soldered joint by using said Pb-free soldering alloy.

DISCLOSURE OF INVENTION

The Pb-free soldering alloy according to the present invention is characterized in that it comprises Cu in 0.05 to 2.0 wt. %, Ni in 0.001 to 2.0 wt. % and Sn in the balance.

According to the present invention, the addition of Ni in 0.001 to 2.0 wt. % to Pb-free Sn—Cu soldering alloy enhances the mechanical strength by about 15 to 30%.

Cu—Ni alloy is perfect solid solution and the added Ni is combined with Cu crystallized out of two-elemental Sn—Cu alloy as a solid solution. In the result, the mechanical strength of the soldering alloy is enhanced.

Furthermore, as the soldering alloy does not include Pb, even when the soldered product is put on a waste yard, the environment can be prevented from being contaminated.

BEST EMBODIMENT FOR INVENTION

We explain the best embodiment of the present invention below.

According to the present invention, a partial amount of Cu of the additional element in Sn—Cu alloy known as a Pb-free soldering alloy is replaced by Ni and as seen in an embodiment shown in Table 2, the Cu to Ni ratio is selected suitably according to the soldering condition.

Of course it is also necessary to take wettability into consideration in addition to mechanical strength for soldering alloy. We have confirmed that the wettability necessary for soldering alloy does not deteriorate by replacing a partial amount of Cu of the additional element by Ni and that a certain combination ratio of Cu and Ni can improve the, wettability.

The melting point in soldering is required to be as low as possible. The melting point of 3-elemental soldering alloy such as Sn—Ni—Cu soldering alloy can be lowered and this can be presumed to a certain extent from the relation between 2-elemental soldering alloy such as Cu—Sn or Ni—Sn soldering alloy and its melting point as shown in Table 1.

TABLE 1

The relation between 2-elemental soldering alloy such as Sn—Cu or Sn—Ni soldering alloy and its melting point

| 2-elemental soldering alloy | chemical content in wt. % (Sn in the balance) | melting point (° C.) |
| --- | --- | --- |
| Sn—Ni | Ni: 0.15 wt. % | 231° C. |
| Sn—Cu | Cu: 0.7 wt. % | 227° C. |

Accordingly, it is thought that the melting point for 3-elemental soldering alloy can be lowered comparatively in the vicinity of the temperature range in which Ni<0.15 wt. % or Cu<0.7 wt. %.

In the embodiment of the present invention, we have recognized that the mechanical strength of the soldering alloy is not lowered by adding Ni and Cu as shown in Table 2 and the rise of the melting point is slight even if it occurs, which is no problem for Pb-free soldering alloy.

TABLE 2

The relation between the chemical content and the mechanical strength for embodiments

| no. of embodiment | chemical content (wt. %) (the balance: Sn) | | mechanical strength tensile strength (kgf/cm$^2$) |
| --- | --- | --- | --- |
| | Ni | Cu | |
| 1 | none | none | 5.9 |
| 2 | none | 0.3 | 6.2 |
| 3 | 0.02 | none | 6.0 |
| 4 | 0.70 | 0.02 | 6.3 |
| 5 | 1.00 | 0.05 | 6.4 |
| 6 | 0.50 | 0.10 | 6.6 |
| 7 | 0.90 | 0.80 | 6.9 |
| conventional example | Sn: 60 wt. % Pb: 40 wt. % | | 5.6 |

What is claimed is:

1. A lead-free soldering alloy consisting of:

about 0.8 wt. % copper;

about 0.9 wt. % nickel; and a balance of tin.

* * * * *